United States Patent
Lorenz et al.

(10) Patent No.: US 12,344,377 B2
(45) Date of Patent: Jul. 1, 2025

(54) FLAP SYSTEM FOR AN AIRCRAFT AND METHOD OF OPERATING A FLAP FAIRING AT AN AIRCRAFT WING

(71) Applicant: Airbus Operations GmbH, Hamburg (DE)

(72) Inventors: Florian Lorenz, Hamburg (DE); Bernhard Schlipf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/425,093

(22) Filed: Jan. 29, 2024

(65) Prior Publication Data
US 2024/0253768 A1 Aug. 1, 2024

(30) Foreign Application Priority Data
Jan. 31, 2023 (EP) ...................................... 23154160

(51) Int. Cl.
*B64C 9/18* (2006.01)
*B64C 9/02* (2006.01)
*B64C 13/28* (2006.01)

(52) U.S. Cl.
CPC .................. *B64C 9/18* (2013.01); *B64C 9/02* (2013.01); *B64C 13/28* (2013.01)

(58) Field of Classification Search
CPC .... B64C 9/18; B64C 9/02; B64C 9/04; B64C 13/28
See application file for complete search history.

(56) References Cited

U.S. PATENT DOCUMENTS

| 4,669,687 A * | 6/1987 | Rudolph | B64C 9/18 244/215 |
| 9,227,722 B2 | 1/2016 | Soenarjo | |
| 2006/0226297 A1* | 10/2006 | Perez-Sanchez | B64C 9/16 244/216 |
| 2012/0292453 A1 | 11/2012 | Schroeder | |
| 2013/0087662 A1* | 4/2013 | Soenarjo | B64C 9/18 244/215 |
| 2017/0158310 A1* | 6/2017 | Osborn | B64C 9/14 |
| 2022/0306279 A1 | 9/2022 | Tulloch | |

FOREIGN PATENT DOCUMENTS

| DE | 102009060082 A1 | 6/2011 |
| WO | 8401343 A1 | 4/1984 |

OTHER PUBLICATIONS

European Search Report for corresponding European Patent Application No. 23154160.8 dated Jul. 3, 2023.

\* cited by examiner

*Primary Examiner* — Rodney A Bonnette
(74) *Attorney, Agent, or Firm* — Greer, Burns & Crain, Ltd.

(57) ABSTRACT

A flap system for an aircraft comprises a wing structure, a trailing-edge and an attachment unit for movably coupling the trailing-edge movable to the wing structure. The attachment unit comprises an attachment mechanism and a cover element which at least partly encloses the attachment mechanism. The attachment unit comprises a drive element which is configured to move the cover element along an aerodynamic outer surface of a skin section of the wing structure between a first position and a second position, wherein the movement of the cover element along the aerodynamic outer surface is defined by a translational movement of the cover element relative to the skin section.

14 Claims, 4 Drawing Sheets

FLAP SYSTEM FOR AN AIRCRAFT AND METHOD OF OPERATING A FLAP FAIRING AT AN AIRCRAFT WING

CROSS-REFERENCES TO RELATED APPLICATIONS

This application claims the benefit of European Patent Application Number 23 154 160.8 filed on Jan. 31, 2023, the entire disclosure of which is incorporated herein by way of reference.

FIELD OF THE INVENTION

The invention generally relates to movable flap systems. In particular, the invention relates to a flap system for an aircraft and a method of operating a flap fairing at an aircraft wing.

BACKGROUND OF THE INVENTION

Movables like flap components for aircraft are usually exposed to strong aerodynamic loads during operation of the aircraft. For example, a flap component such as a trailing edge flap is exposed to strong aerodynamic loads when deployed to its extended configuration. Coupling devices or mechanisms which are configured to couple the flap component to the wing structure of the aircraft are also exposed to the strong aerodynamic loads and these coupling devices or mechanisms are therefore usually protected by corresponding cover elements like fairings. In general, the design and shape of such fairings is aerodynamically optimized and specifically adapted to the underlying coupling device or mechanism that is to be protected by the fairing. When the flap component is deployed to its extended configuration, the coupling device or mechanism may cause the fairing to move away from the wing structure.

DE 10 2009 060 082 A1 and US 2012/0292453 A1 describe a wing arrangement which includes an adjustable flap that is adjustable between a retracted position and at least one extended position and which has at least one fairing element for covering a flap adjustment mechanism and at least one cover element.

SUMMARY OF THE INVENTION

It may be seen as an object of the invention to improve the aerodynamic characteristics of a flap system during flap deployment.

A system and a method according to various embodiments are provided. Further embodiments of the invention are also disclosed in the following description.

According to an aspect of the invention, a flap system for an aircraft is provided. The flap system comprises a wing structure having a skin section with an aerodynamic outer surface. The flap system further comprises a trailing-edge unit comprising at least one trailing-edge movable which is movable between a retracted position and an extended position. In an example, the trailing-edge unit is a flap unit and the trailing-edge movable is a flap component. The flap system further comprises an attachment unit for movably coupling the at least one trailing-edge movable to the wing structure. The attachment unit comprises an attachment mechanism and a cover element which at least partly encloses the attachment mechanism. The attachment unit comprises a drive element which is configured to move the cover element along the aerodynamic outer surface of the skin section between a first position and a second position. The movement of the cover element along the aerodynamic outer surface of the skin section between the first position and the second position is defined by a translational movement of the cover element relative to the skin section between the first position and the second position.

The inventive flap system provides improved aerodynamic characteristics during the movement of the trailing-edge movable from the retracted position to the extended or deployed position. In particular, the cover element which covers the attachment mechanism from the surrounding air flow is moved in a translational movement along the aerodynamic outer surface, e.g., the lower surface, of the wing structure when the trailing-edge movable is moved between the retracted position and the extended position. There might be no rotational movement of the cover element when the translational movement of the cover element is carried out.

The inventive concept of translationally moving the cover element, which is herein also referred to as flap-track fairing or simply as fairing, provides advantages for flap systems which are configured to increase the size of the wing area. Usually flap systems may allow a trailing edge of the wing structure to increase the wing area via a variable cambering of the trailing edge flap, wherein the trailing edge flap is moved downwardly along a cambered path. However, the inventive flap system provides the possibility to reduce or increase the wing area by a translational movement of the trailing-edge movable and related components like fairings etc., for example by shifting these components substantially parallel to the flight direction or parallel to the air flow direction.

As described above, the flap system comprises the wing structure which may be seen as the base system to which the trailing-edge movable is movably coupled. The wing structure has a skin section with an aerodynamic outer surface. In particular, the wing structure has an aerodynamic upper surface and an aerodynamic lower surface. The upper and lower surfaces may be connected to each other via a leading edge at the front of the wing structure and via a trailing edge at the rear of the wing structure. The at least one trailing-edge movable may be a flap or part of a flap and may be arranged at the rear of the wing structure. Multiple trailing-edge movables may together form the trailing-edge unit. For example, multiple trailing-edge movables are arranged next to each other along a spanwise extension direction of the wing structure. However, multiple trailing-edge movables may also be arranged next to each other along a chordwise extension direction of the wing structure, wherein the trailing-edge movables provide a series of trailing-edge movables coupled to each other.

The attachment unit couples the at least one trailing-edge movable to the wing structure and the attachment mechanism as part of the attachment unit may enable a specified movement of the trailing-edge movable relative to the wing structure. As the attachment mechanism at least partly protrudes out of the wing structure and thus beyond the outer aerodynamic surface, for example beyond the lower aerodynamic surface of the wing structure, the cover element is provided to cover and protect the attachment mechanism from the surrounding air flow. The cover element may be specifically shaped in order to at least partly house and thus at least partly enclose the attachment mechanism on the aerodynamic outer surface. In particular, the cover element covers the part of the attachment mechanism that protrudes out of the wing structure, i.e., that protrudes beyond the aerodynamic outer surface. The cover element may thus appear in the form of a protrusion on the aerodynamic outer surface. The cover element may be aerodynamically optimized to reduce the drag occurring as a result of an air flow interfering with the cover element.

Upon actuation by the drive element, the at least one trailing-edge movable may be moved, i.e., shifted, from the retracted position to the extended or deployed position. The cover element may be configured to move from the first position to the second position when the at least one trailing-edge movable is moved from the retracted position to the extended position. In other words, the cover element is movable together with the at least one trailing-edge movable. In particular, the cover element may be directly coupled to the attachment mechanism which couples the at least one trailing-edge movable to the wing structure, or the cover element may be directly coupled to the drive element which initiates the movement of the at least one trailing-edge movable relative to the wing structure. It is possible that the at least one trailing-edge movable also moves parallel to the translational movement of the cover element when the at least one trailing-edge movable is moved from the retracted position to the extended position, thereby increasing a wing size without a cambering motion of the at least one trailing-edge movable. Different couplings or linkages may be provided to enable the movement of the trailing-edge movable and/or the cover element relative to the wing structure. This will be described in further detail in the description of the Figures below.

In particular, the cover element moves, i.e., translates or shifts, along the aerodynamic outer surface of the skin section between the first position and the second position. This means that the movement of the cover element along the aerodynamic outer surface of the skin section between the first position and the second position is defined by a translational movement of the cover element relative to the skin section between the first position and the second position.

In this case, a translational movement may be defined by a linear movement in which all points on the structure of the cover element experience the same shift in the movement direction, e.g., with respect to the skin section of the wing structure, and/or in which, for a distinct point in time, all points on the structure of the cover element experience the same velocities and accelerations, e.g., with respect to the skin section of the wing structure.

It is possible that there is only a translational movement and no rotational movement of the cover element with respect to the skin section of the wing structure, at least for a specified movement distance, for example between the first position and the second position.

The first position may define a position of the cover element which is closer to the leading edge of the wing structure and the second position may define a position of the cover element which is arranged downstream of the first position, in particular with respect to the air flow direction along the aerodynamic outer surface of the wing structure. In other words, when the cover element is moved from the first to the second position, it is moved substantially in or substantially parallel to the flow direction along the wing structure.

Therefore, the cover element may move with respect to the aerodynamic outer surface of the skin section in such a way that a distance between the cover element and the aerodynamic outer surface of the skin section does not change. In this manner, gaps between the cover element and the aerodynamic outer surface of the skin section may be avoided or at least kept at a constant size when the trailing-edge movable is moved to the extended position and, thus, when the cover element is moved from the first position to the second position.

According to an embodiment, a rotational movement of at least a part of the cover element relative to the skin section is substantially prevented when the cover element is moved along the aerodynamic outer surface of the skin section between the first position and the second position.

For example, the cover element may be split into two or more cover element portions, wherein at least one of these cover element portions is translationally moved with respect to the aerodynamic outer surface of the skin section without any rotational movement.

However, it is possible that the entire cover element is translationally moved with respect to the aerodynamic outer surface of the skin section without any rotational movement. This may be the case where the cover element is represented by a single-piece structure.

In an example, there might be a small rotational movement of the cover element or at least a part of the cover element, such that a minimal rotational movement of the cover element or the part thereof may occur when the cover element or the part thereof is moved along the aerodynamic outer surface of the skin section between the first position and the second position. In other words, the movement of the cover element or the part thereof may be mainly parallel with respect to the aerodynamic outer surface, with only a very minor rotational movement.

According to an embodiment, the translational movement of the cover element relative to the skin section between the first position and the second position is defined by a movement of the cover element parallel to the skin section.

During said translational movement of the cover element along the aerodynamic outer surface of the skin section, the cover element may thus perform a movement parallel to the surface of the wing stricture, e.g., parallel to the lower surface of the wing structure.

According to an embodiment, the cover element covers the attachment mechanism from an air flow on the aerodynamic outer surface of the skin section when being moved along the aerodynamic outer surface of the skin section between the first position and the second position.

As indicated above, the cover element at least partly encloses the attachment mechanism of the attachment unit, thereby protecting the attachment mechanism from the surrounding air flow. The cover element may have shell-like or panel-like structure with an aerodynamic design. However, since the cover element is moved in a translational movement along the aerodynamic outer surface of the wing structure, there might be no change in the cross-sectional area of the cover element that is effectively exposed to the air flow. The drag induced by the cover element may thus be kept at a substantially constant level. Otherwise, if there would be a rotational movement of the cover element, there would be an increase in the cross-sectional area of the cover element that is effectively exposed to the air flow, thus increasing the drag.

According to an embodiment, the cover element comprises a first cover portion and a second cover portion, wherein the attachment unit is configured to couple first cover portion to the wing structure and to couple the second cover portion to the wing structure, such that the second cover portion can be moved relative to the first cover portion.

In an example, the either one or both of the first cover portion and the second cover portion can be moved relative to the aerodynamic outer surface of the skin section. In particular, the first cover portion and the second cover portion may be moved independently from each other. The movement of the first cover portion and/or the second cover portion may be a translational movement along and/or parallel the aerodynamic outer surface of the skin section between the first position and the second position.

According to an embodiment, the attachment mechanism of the attachment unit is configured to movably couple the at least one trailing-edge movable to the wing structure in order to enable a movement of the at least one trailing-edge movable between the retracted position and the extended position.

The attachment mechanism may be configured to directly or indirectly couple the at least one trailing-edge movable to the wing structure. It is possible that the attachment mechanism comprises multiple linkages which couple respective trailing-edge movables to the drive element. A part of the attachment mechanism may protrude beyond the aerodynamic outer surface. i.e., from the inside of the wing structure to the outside of the wing structure, and the attachment mechanism is therefore covered by the cover element form the surrounding air flow in order to improve the air flow and thus reduce drag.

According to an embodiment, the drive element is configured to move the at least one trailing-edge movable via the attachment mechanism, wherein the cover element is coupled to the attachment mechanism via a coupling element, such that the drive element is configured to move the cover element via the attachment mechanism.

The attachment mechanism may comprise a linkage which couples the drive element to the at least one trailing-edge movable. The coupling element may be a connector strut that is connected to the linkage and is thus kinematically coupled to the drive element. In other words, the coupling element links the motion of the cover element to the motion of the at least one flap element. Accordingly, if the drive element initiates a movement of the at least one trailing-edge movable, a corresponding movement of the cover element is also initiated besides the movement of the at least one trailing-edge movable.

The drive element may be a motor or an actuator which enables the movement of the attachment mechanism. The drive element may include a geared rotary actuator (GRA). In an example the coupling element may be directly coupled to the drive element. In another example, the coupling element may be directly coupled to the at least one trailing-edge movable. However, these exemplary couplings may be configured such that the movement of the cover element is restricted to a translational movement along the aerodynamic outer surface of the skin section as described above, independent of any possibly occurring rotational movement of the at least one trailing-edge movable.

According to an embodiment, the drive element is configured to move the cover element along the aerodynamic outer surface of the skin section between the first position and the second position while the at least one trailing-edge movable is moved from the retracted position to the extended position.

If the at least one trailing-edge movable is in the extended position, the trailing-edge movable may be extended, i.e., deployed, to its maximum deployment state. The extended position may be defined by a positive or negative deployment of the at least one trailing-edge movable.

It is possible that the second position to which the cover element is movable may be the most rearward position of the cover element with respect to the wing structure, whereas the first position may be the most forward position of the cover element with respect to the wing structure.

The first position of the cover element may be present when the at least one trailing-edge movable is in the retracted position and/or the second position may be present when the at least one trailing-edge movable is in the extended position. However, it is possible that the cover element has reached the second position even if the at least one trailing-edge movable is not fully extended. That is, the second position of the cover element may occur when the trailing-edge movable is somewhere between its retracted and extended position.

According to an embodiment, the flap system further comprises a sealing element configured to seal a gap between the cover element and the aerodynamic outer surface of the skin section.

The sealing element may be adapted to the gap size, i.e., to the distance between an upper edge of the cover element and the aerodynamic outer surface. The sealing element may be fixedly connected to the upper edge of the cover element. The sealing element comprise a rubber seal or a polymer seal.

According to an embodiment, the sealing element is configured to seal the gap between the cover element and the aerodynamic outer surface of the skin section during the movement of the cover element along the aerodynamic outer surface of the skin section between the first position and the second position.

Since the cover element is moved along and/or parallel to the aerodynamic outer surface of the skin section, the sealing element may seal the gap during the entire movement of the cover element between the first position and the second position. The sealing element may prevent an air flow from entering into a region between the cover element and the aerodynamic outer surface which would lead to an interference of the air flow with the attachment mechanism.

According to an embodiment, the attachment unit comprises an engagement mechanism for movably coupling the cover element to the wing structure, wherein the engagement mechanism comprises a track element and a corresponding engagement element that is configured to engage with the track element in order to movably couple the cover element to the wing structure.

The engagement mechanism may be fixedly connected to the above-described coupling element which in turn may be directly coupled to the drive element, directly coupled to the linkage that couples the drive element to the trailing-edge movable, or directly coupled to the wing structure.

The track element may comprise two tracks on each side of the coupling element. The engagement element may be adapted to functionally cooperate with the track element in order to allow a moving or sliding of the engagement element within the track element, such that the cover element may be moved or slid with respect to the coupling element and thus with respect to the wing structure.

According to an embodiment, the track element is coupled to the cover element and the engagement element is coupled to the wing structure. Alternatively, the track element is coupled to the wing structure and the engagement element is coupled to the cover element.

In an example, the engagement element is fixedly connected to the above-described coupling element which in turn may be coupled to the wing structure, for example via the drive element, etc.

According to an embodiment, the engagement element comprises a roller arrangement that is configured for rolling engagement with the track element.

Multiple rollers may be adapted to roll within tracks of the track element. The rollers may thus provide a bearing or suspension feature for supporting the cover element with respect to the wing structure.

According to an aspect, the flap system as described herein is used for a trailing edge flap system of an aircraft.

In particular, the wing structure may be part of a wing of the aircraft. The flap system may thus be arranged at a trailing edge region of the aircraft wing and provides a high-lift device for the aircraft. The cover element with the above-described characteristics may be a flap-track fairing of the flap system.

According to another aspect, a method of operating a flap fairing at an aircraft wing is provided. A step of the method comprises activating a drive element which is coupled to a wing structure of the aircraft wing, wherein the wing structure comprises a skin section with an aerodynamic outer surface. Another step of the method comprises moving, by the drive element, at least one trailing-edge movable that is coupled to the drive element via an attachment mechanism, such that the at least one trailing-edge movable is moved from a retracted position to an extended position. Another step of the method comprises moving, by the drive element, the flap fairing which at least partly encloses the attachment mechanism, wherein moving the flap fairing comprises moving the flap fairing along the aerodynamic outer surface of the skin section between a first position and a second position, wherein the movement of the flap fairing between the first position and the second position is defined by a translational movement, in particular without a rotational movement, of the flap fairing relative to the skin section between the first position and the second position.

The above-described method steps may be performed in the indicated order.

BRIEF DESCRIPTION OF THE DRAWINGS

The present invention will hereinafter be described in conjunction with the following drawing figures, wherein like numerals denote like elements, and wherein.

DETAILED DESCRIPTION OF THE PREFERRED EMBODIMENTS

The representations and illustrations in the drawings are schematic and not to scale. A better understanding of the method and system described above may be obtained through a review of the illustrations accompanying this application together with a review of the detailed description that follows.

Figure 1:
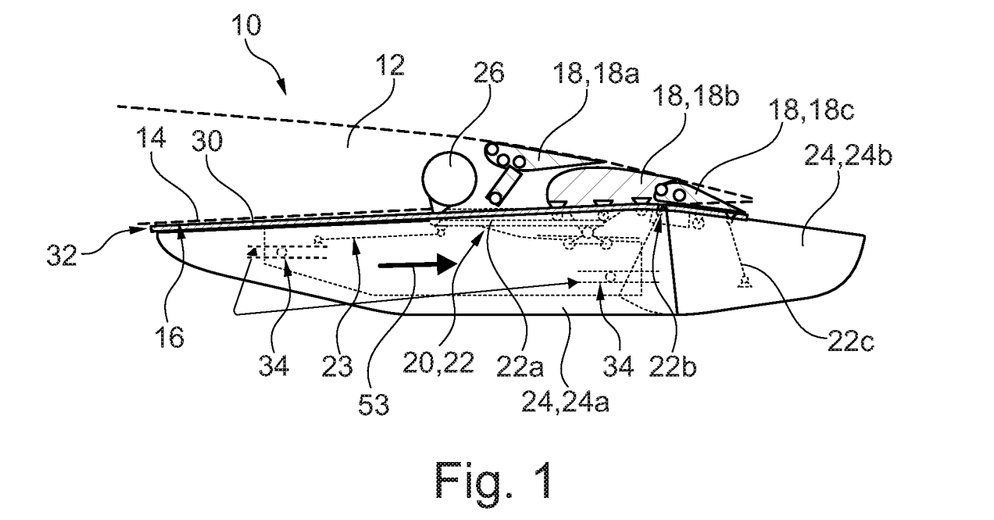
FIG. 1 shows a side view of a flap system according to an exemplary embodiment.

FIG. 1 shows a side view of a flap system 10 for an aircraft. The flap system 10 comprises a wing structure 12 (indicated by dashed lines) having a skin section 14 with an aerodynamic outer surface 16. The flap system 10 further comprises a trailing-edge unit 18 comprising at least one trailing-edge movable 18a, 18b, 18c which is movable between a retracted position and an extended position. The retracted and extended positions will be described in more detail with respect to FIGS. 5A to 5B below.

In the example shown in FIG. 1, the trailing-edge unit 18 comprises three trailing-edge movables 18a, 18b, 18c, e.g., a spoiler, a droop panel or air brake 18a, a main flap 18b and a tab 18c. These trailing-edge movables 18a, 18b, 18c may be coupled to each other and/or to a corresponding attachment mechanism which couples the trailing-edge movables 18a, 18b, 18c to the drive element 26. In particular, the flap system 10 comprises an attachment unit 20 for movably coupling the trailing-edge unit 18 including the one or more of the trailing-edge movables 18a, 18b, 18c to the wing structure 12. The attachment unit 20 comprises an attachment mechanism 22 and a cover element 24 which at least partly encloses the attachment mechanism 22. The attachment mechanism 22 kinematically couples the drive element 26 to the trailing-edge unit 18 and/or to the cover element 24. In particular, the attachment mechanism 22 comprises a coupling element 23 which connects the cover element 24 to the attachment mechanism 22. In the example shown in FIG. 1, the attachment mechanism 22 may comprise a linkage 22a which couples the drive element 26 to the at least one trailing-edge movable 18a, 18b, 18c. The coupling element 23 may be a connector strut 23 that is connected to the linkage 22a and is thus kinematically coupled to the drive element 26. Therefore, the coupling element 23 links the motion of the cover element 24 to the motion of the at least one flap element 18a, 18b, 18c. Accordingly, if the drive element 26 initiates a movement of the at least one trailing-edge movable 18a, 18b, 18c, a corresponding movement of the cover element 24 is also initiated besides the movement of the at least one trailing-edge movable 18a, 18b, 18c.

The cover element 24 is coupled to the drive element 26 in such a way that the cover element 24 may be moved, i.e., shifted or translated, along the aerodynamic outer surface 16 of the skin section 14 between a first position and a second position. The first and second positions will be described in more detail with respect to FIGS. 5A to 5B below. The movement of the cover element 24 along the aerodynamic outer surface 16 of the skin section 14 between the first position and the second position is defined by a translational movement 53 (indicated by an arrow), without any rotational movement, of the cover element 24 relative to the skin section 14 between the first position and the second position. In other words, a rotational movement of at least a part of the cover element 24 relative to the skin section 14 is prevented when the cover element 24 is moved along the aerodynamic outer surface 16 of the skin section 14. The translational movement 53 of the cover element 24 relative to the skin section 14 is defined by a movement of the cover element 24 which is substantially parallel to the skin section 14.

The flap system 10 further comprises an engagement mechanism 34 for movably coupling the cover element 24 to the wing structure 12. As shown in FIG. 1, the cover element 24 may be coupled via the engagement mechanism 34, the coupling element 23, the linkage 22a and the drive element 26 to the wing structure 12. The drive element 26 may be fixedly arranged at the wing structure. The engagement mechanism 34 comprises a track element and a corresponding engagement element that is configured to engage with the track element in order to movably couple the cover element 24 to the wing structure 12. The engagement mechanism 34 will be described in more detail with respect to FIGS. 3A and 3B below. One or more of such engagement mechanisms 34 may be provided to movably support the cover element 24 with respect to the wing structure 12. In the example shown in FIG. 1, two engagement mechanisms 34 are provided.

The flap system 10 further comprises a sealing element 30 which is configured to seal a gap 32 between an upper edge of the cover element 24 and the aerodynamic outer surface 16 of the skin section 14. The sealing element 30 is configured to seal the gap 32 between the cover element 24 and the aerodynamic outer surface 16 of the skin section 14 during the entire translational movement 53 of the cover element 24 along the aerodynamic outer surface 16 of the skin section 14, since this translational movement 53 has a parallel orientation with respect to the aerodynamic outer surface 16. The cover element 24 can thus cover the attachment mechanism 22 from an air flow on the aerodynamic outer surface 16 of the skin section 14 during the entire translational movement 53 of the cover element 24 along the aerodynamic outer surface 16 of the skin section 14. In particular, the cover element 24 houses or encloses the attachment mechanism during the entire translational movement 53 of the cover element 24 along the aerodynamic outer surface 16 of the skin section 14.

Furthermore, the cover element 24 comprises a first cover portion 24a and a second cover portion 24b, wherein the attachment unit 20 is configured to couple first cover portion 24a to the wing structure 12 as described above, and to couple the second cover portion 24b to the wing structure 12 as described above. In this manner the second cover portion 24b can be moved relative to the first cover portion 24a. For example, both the first cover portion 24a and the second cover portion 24b can be moved together in a translational movement 53 up to a distinct point, for example up to the second position and, afterwards, can be moved relative to each other. This relative movement between the first cover portion 24a and the second cover portion 24b can be defined by a rotational movement of the second cover portion 24b after the second position has been reached, while the first cover portion 24a maintains its orientation at the second position. For the rotational movement of the second cover portion 24b, the second cover portion 24b may be connected via a drive strut linkage 22c to the trailing-edge unit 18, in particular to the tab 18c. Thus, the rotation of the second cover portion 24b is linked to the tab motion. In an example, the second cover portion 24b is fixed to the tab 18c itself, or it may be fixed to a tab drive lever. The second cover portion 24b may be rotated, i.e., pivoted, around a pivoting point 22b during rotation of the second cover portion 24b. Since the second cover portion 24b may represent the rear part of the cover element 24, the second cover portion 24b may herein also be referred to as rear movable fairing and the pivot point 22b may be referred to as rear movable fairing pivot 22b.

Figure 2:
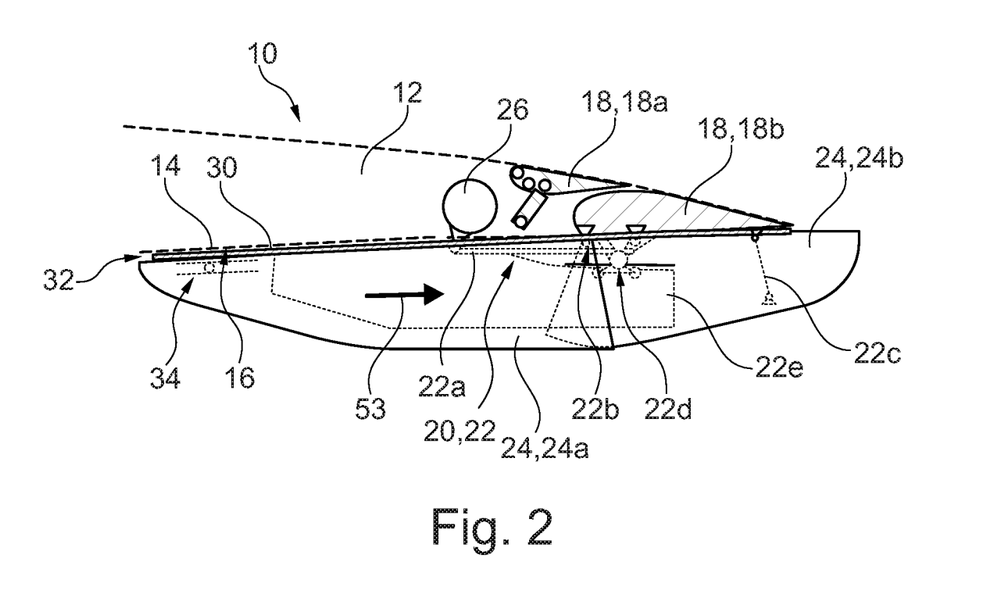
FIG. 2 shows a side view of a flap system according to another exemplary embodiment.

FIG. 2 shows a side view of another flap system 10, essentially having the same characteristics and functionalities as the flap system 10 described with respect to FIG. 1 above. However, the flap system 10 of FIG. 2 represents a so-called fix flap system, wherein the trailing-edge unit 18 comprises a spoiler or air brake 18a and a main flap 18b without any further tabs.

Again, the trailing-edge unit 18 is kinematically coupled to the drive element 26. In particular, the flap system 10 comprises the attachment unit 20 for movably coupling the trailing-edge unit 18 including the trailing-edge movables 18a and 18b to the wing structure 12. The attachment unit 20 comprises the attachment mechanism 22 and the cover element 24 which at least partly encloses the attachment mechanism 22. The attachment mechanism 22 kinematically couples the drive element 26 to the trailing-edge unit 18 and/or to the cover element 24. In the example shown in FIG. 1, the attachment mechanism 22 also comprises the linkage 22a which couples the drive element 26 to the trailing-edge movables 18a and 18b such that the trailing-edge movables 18a and 18b can be deployed upon actuation by the drive element 26.

The cover element 24 again comprises a first cover portion 24a and a second cover portion 24b, wherein the attachment unit 20 is configured to couple first cover portion 24a to the wing structure 12 as described above, and to couple the second cover portion 24b to the wing structure 12 as described above. In this manner the second cover portion 24b can be moved relative to the first cover portion 24a. Thus, the rotation of the second cover portion 24b is linked to the flap motion. For a rotational movement of the second cover portion 24b, the second cover portion 24b may be connected via the drive strut linkage 22c to the trailing-edge unit 18, in particular to the main flap 18b. The second cover portion 24b may be rotated, i.e., pivoted, around a pivoting point 22b during rotation of the second cover portion 24b. Since the second cover portion 24b again represents the rear part of the cover element 24, the second cover portion 24b may herein also be referred to as rear movable fairing and the pivot point 22b may be referred to as rear movable fairing pivot 22b. A support bracket 22d links the motion of the second cover portion 24b to the motion of the main flap 18b. In an example, the second cover portion 24b may be fixed to the main flap 18b, but it may alternatively be fixed to a carriage 22e or a support of the main flap 18b, wherein the corresponding fixation may be close or colinear to a rotation axis of the main flap 18b.

The translational movement 53 of the cover element 24 relative aerodynamic outer surface 16 of the skin section 14 is defined by a movement of the cover element 24 parallel to the skin section 14 of the wing structure 12 as described with respect to FIG. 1 above. The sealing element 30 in the gap 32 between the upper edge of the cover element 24 and the aerodynamic outer surface 16, as well as the engagement mechanism 34 for supporting the cover element 24 on the wing structure 12 may also be configured in the same manner as described with respect to FIG. 1 above.

Figure 3A:
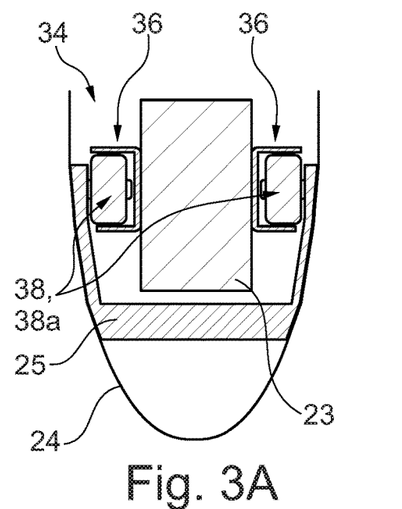
FIG. 3A shows a cross-sectional view of a cover element and an engagement mechanism according to an exemplary embodiment.

FIG. 3A shows a cross-sectional view of a cover element 24 and an engagement mechanism 34, for example the cover element 24 and the engagement mechanism 34 of the flap systems 10 of FIGS. 1 and 2 above.

The engagement mechanism 34 may be part of the attachment unit 20 (cf. FIGS. 1 and 2) and is configured for movably coupling the cover element 24 via the coupling element 23 to the wing structure 12. The engagement mechanism 34 comprises a track element 36 which in this case has two tracks. The engagement mechanism 34 further comprises a corresponding engagement element 38 that is configured to engage with the track element 36 in order to movably couple the cover element 24 to the coupling element 23 and thus to the wing structure 12. In FIG. 3A, the corresponding engagement element 38 is comprised of a roller arrangement 38a that is configured for rolling engagement with the track element 36. In particular, one or more rollers 38a are arranged on each side of the cover element 24, e.g., on each side of the coupling element 23. These rollers 38a roll up and down within the two tracks of the track element 36 when the cover element 24 is moved from the first position to the second position and vice versa.

In the example shown in FIG. 3A, the track element 36 is coupled to the wing structure 12, i.e., via the coupling element 23, and the engagement element 38 is coupled to the cover element 24. An inset 25 may be provided within the cover element 24, wherein the inset 25 is configured to carry the roller arrangement 38a within a cavity of the cover element 24.

Figure 3B:
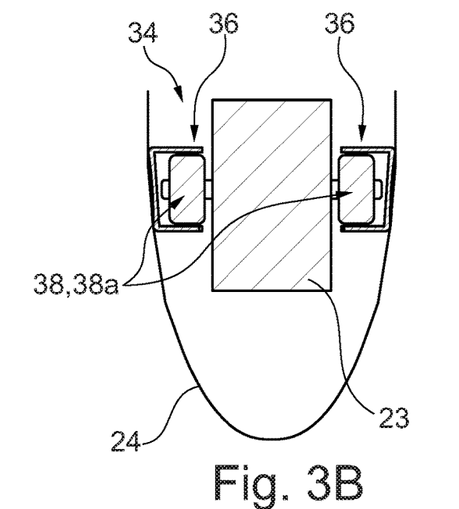
FIG. 3B shows a cross-sectional view of a cover element and an engagement mechanism according to another exemplary embodiment.

The example shown in FIG. 3B illustrates a configuration in which the track element 36 is directly coupled to the cover element 24 and the engagement element 38 is coupled to the wing structure 12, i.e., via the coupling element 23.

Figure 4A:
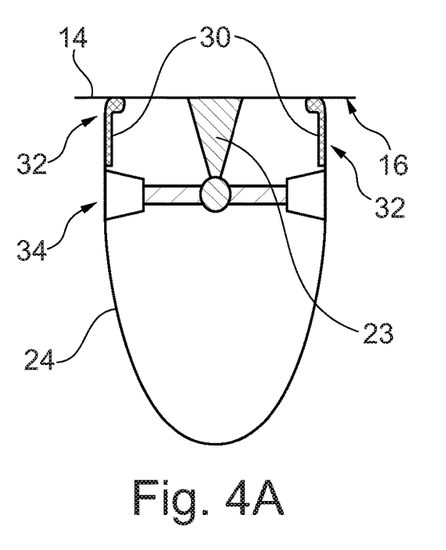
FIG. 4A shows a cross-sectional view of a cover element and a sealing element according to an exemplary embodiment.

FIG. 4A shows a cross-sectional view of a cover element and a sealing element, for example the cover element 24 and the sealing element 30 of the flap systems 10 of FIGS. 1 and 2 above.

The sealing element 30 seals the gap 32 between the cover element 24 and the aerodynamic outer surface 16 of the skin section 14. In particular, the sealing element 30 seals the gap 32 located between an upper edge of the cover element 24 and the aerodynamic outer surface 16. In addition, the sealing element 30 may seal a gap 32 located between an upper edge of the cover element 24 and one or more of the trailing-edge movables 18a, 18b, 18c (cf. FIG. 1).

The sealing element 30 is especially configured to seal the gap 32 between the cover element 24 and the aerodynamic outer surface 16 of the skin section 14 during the movement of the cover element 24 along the aerodynamic outer surface 16 of the skin section 14 between the first position and the second position. This may be due to the fact that the size of the gap 32, in particular the distance between the upper edge of the cover element 24 and the aerodynamic outer surface 16, does not change during the translational movement 53 of the cover element 24 along the aerodynamic outer surface 16 (cf. FIGS. 1 and 2).

Figure 4B:
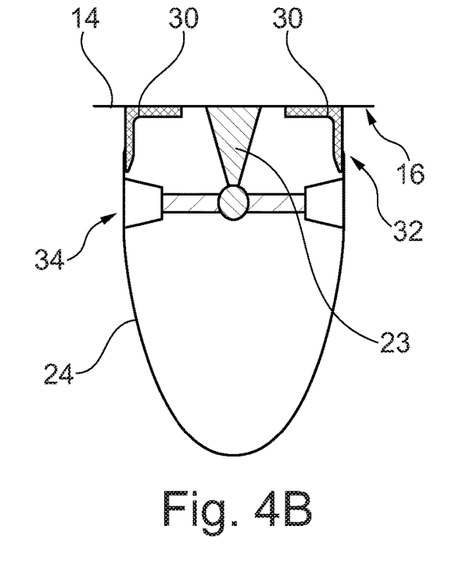
FIG. 4B shows a cross-sectional view of a cover element and a sealing element according to another exemplary embodiment.

FIGS. 4A and 4B show alternative configurations of sealing elements 30. In particular, the sealing element 30 in the cross-sectional view of FIG. 4A may have a substantially straight configuration with a small hook-like portion which contacts the aerodynamic outer surface 16. The sealing element 30 in the cross-sectional view of FIG. 4B may have an L-shape with a first flange portion contacting the aerodynamic outer surface 16 and a second flange portion connected to the upper edge of the cover element 24. In both configurations, the sealing element 30 may be fixedly connected, i.e., bonded, to the cover element 24.

FIGS. 4A and 4B also schematically show the coupling element 23 which couples the engagement mechanism 34 to the wing structure 12 as described with respect to FIGS. 1 to 3B.

Figure 5A:
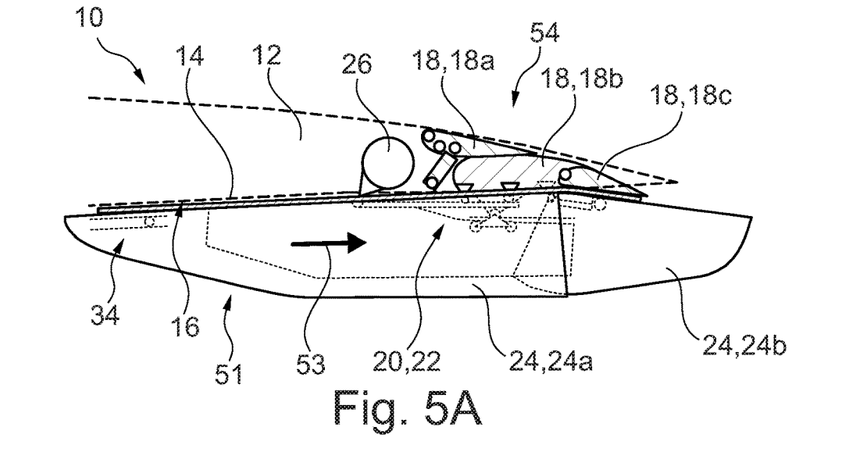
FIG. 5A shows a side view of a flap system with a cover element in a first position, according to an exemplary embodiment.

FIG. 5A shows a side view of a flap system, for example the flap system 10 of FIG. 1 above. The flap system 10 comprises the cover element 24 in the first position 51. In the first position 51, the cover element 24 including its first and second cover portions 24a, 24b may be located at its most forward position relative to the wing structure 12. The first position 51 of the cover element 24 may thus correspond to a retracted position 54 of the trailing-edge unit 18 in which the trailing-edge movables 18a, 18b, 18c are in the retracted position 54. The attachment unit 20 including the drive element 26 and the attachment mechanism 22 are thus in a configuration where the trailing-edge movables 18a, 18b, 18c are kept in the retracted position 54 with respect to the wing structure 12. As can be seen from FIG. 5A, the cover element 24 is arranged adjacent. i.e., next to the aerodynamic outer surface 16 of the skin section 14. Upon actuation by the drive element 26, the cover element 24 may be moved according to the translational movement 53 along the aerodynamic outer surface 16 of the skin section 14. This translational movement 53 is enabled by the engagement mechanism 34 which allows a rolling or sliding movement of the cover element 24 with respect to the wing structure 12.

Figure 5B:
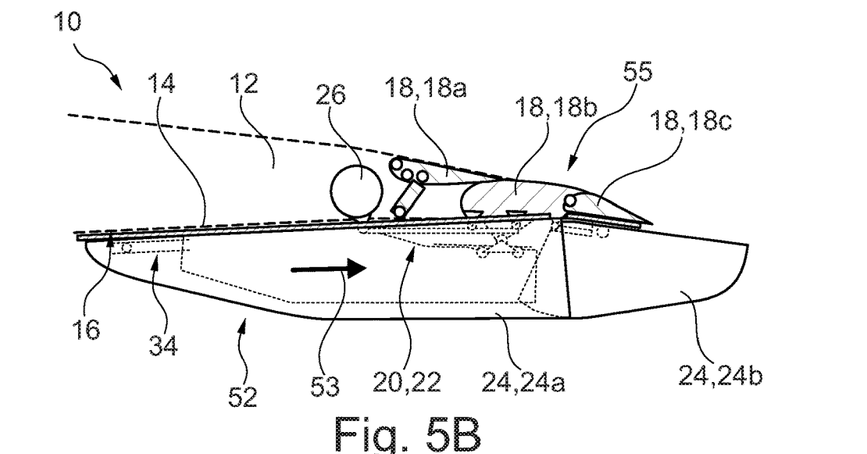
FIG. 5B shows a side view of a flap system with a cover element in a second position, according to an exemplary embodiment.

FIG. 5B now shows a side view of the flap system 10 with the cover element 24 in the second position 52. In the second position 52, the cover element 24 including its first and second cover portions 24a, 24b may be located at its most rearward position relative to the wing structure 12. The second position 52 of the cover element 24 may thus correspond to an extended or deployed position 55 of the trailing-edge unit 18 in which the trailing-edge movables 18a, 18b, 18c are in the extended or deployed position 55. The attachment unit 20 including the drive element 26 and the attachment mechanism 22 are thus in a configuration where the trailing-edge movables 18a, 18b, 18c are hold in the extended or deployed position 55 with respect to the wing structure 12. As can be seen from FIG. 5B, the cover element 24 is still arranged adjacent. i.e., next to the aerodynamic outer surface 16 of the skin section 14 since, during the translational movement 53, the distance between the cover element 24 and the aerodynamic outer surface 16 has not changed. In particular, the drive element 26 has pushed or pulled the cover element 24 in a rearward direction along the aerodynamic outer surface 16 of the skin section 14.

As can be seen from a comparison of FIGS. 5A and 5B, the main trailing-edge movable 18b has moved away, i.e., has been extended, from the spoiler or air brake 18a during the translational movement 53 of the cover element 24 along the aerodynamic outer surface 16 of the skin section 14. At the second position 52, the second cover position 24b of the cover element 24 may experience a slight positive rotation with respect to the first cover portion 24a of the cover element 24. This positive rotation of the second cover position 24b may correspond to a positive rotation of the tab 18c when being moved to the extended position 55. In particular, the tab 18c may be moved downwardly with respect to the wing structure 12 when being moved to the extended position 55.

Figure 5C:
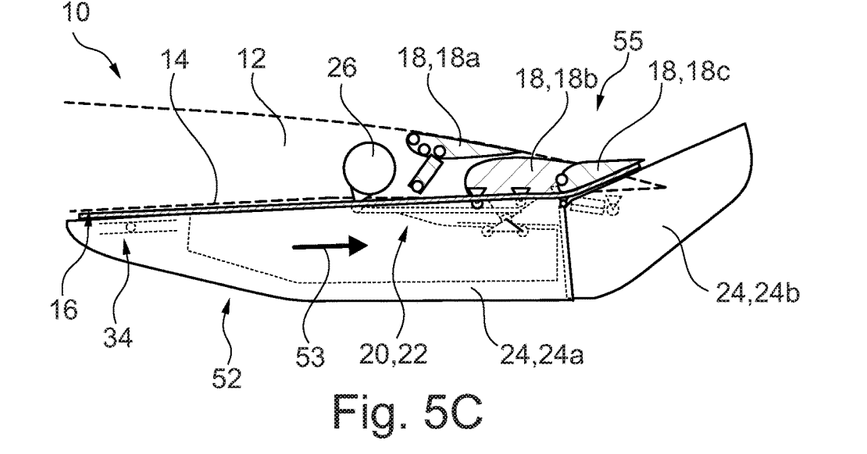
FIG. 5C shows a side view of a flap system with a cover element in a second position, according to another exemplary embodiment.

FIG. 5C now shows a side view of the flap system 10 with the cover element 24 in the second position 52. The configuration for the different components shown in FIG. 5C are similar to those shown in FIG. 5B, except the configuration for tab 18c and the second cover portion 24b. That is, the tab 18c has experienced a negative rotation with respect to the main trailing-edge movable 18b and the second cover portion 24b has experienced a corresponding negative rotation with respect to the first cover portion 24a of the cover element 24. In particular, the tab 18c is moved upwardly with respect to the wing structure 12 when being moved to the extended position 55, e.g., after the cover portions 24a, 24b have been moved to the second position 52.

It is noted that for both extended configurations as shown in FIGS. 5B and 5C, the first cover portion 24a has not carried out any rotational movement and is still located adjacent, i.e., next to the aerodynamic outer surface 16. This means that at least a part of the cover element 24 may remain close to the aerodynamic outer surface 16 without performing any rotational movement.

Figure 6:
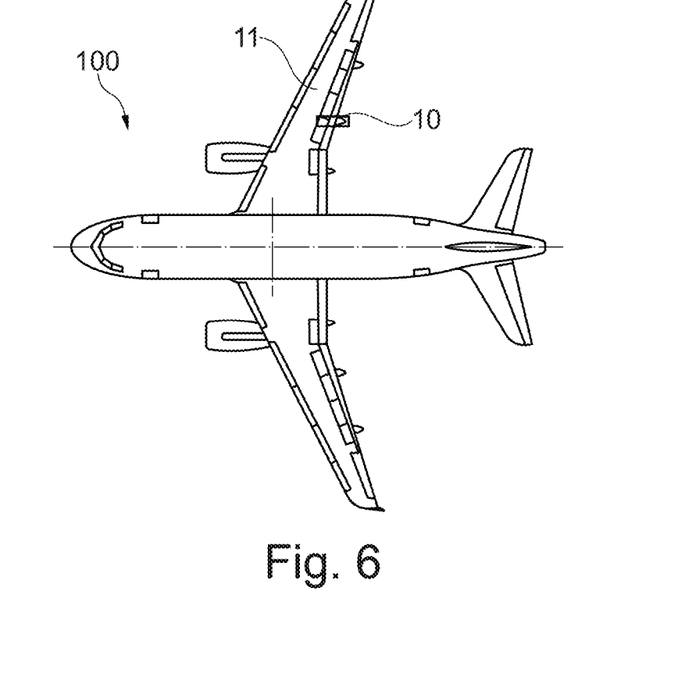
FIG. 6 shows an aircraft having a flap system according to an exemplary embodiment.

FIG. 6 shows an aircraft 100 comprising the flap system 10 as described with respect to FIGS. 1 to 5C above. The aircraft 100 comprises a wing 11 into which the flap system 10 is integrated. The aircraft 100 may be a transport aircraft or passenger aircraft. The cover element 24 as described with respect to FIGS. 1 to 5C above may be a part of the flap system 10 of the aircraft 100.

Figure 7:
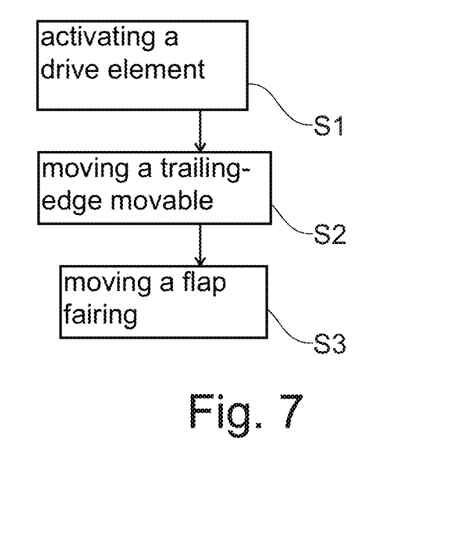
FIG. 7 shows flow diagram for a method of operating a flap fairing at an aircraft wing, according to an exemplary embodiment.

FIG. 7 shows a flow diagram for a method of operating a flap fairing at an aircraft wing. In particular, FIG. 7 shows a flow diagram for a method of operating the flap fairing 24, i.e., the cover element 24 (cf. FIGS. 1 to 5C), at the aircraft wing 11 of the aircraft 100 shown in FIG. 6. In a step S1 of the method, a drive element 26 which is coupled to a wing structure 12 of the aircraft wing 11 is activated, wherein the wing structure 12 comprises a skin section 14 with an aerodynamic outer surface 16. In a step S2 of the method, the drive element 26 moves at least one trailing-edge movable 18a, 18b, 18c that is coupled to the drive element 26 via an attachment mechanism 22, such that the at least one trailing-edge movable 18a, 18b, 18c is moved from a retracted position 54 to an extended position 55. In a step S3 of the method, the drive element 26 moves the flap fairing 24 which at least partly encloses the attachment mechanism 22. This movement of the flap fairing 24 comprises moving the flap fairing 24 along the aerodynamic outer surface 16 of the skin section 14 between a first position 51 and a second position 52, wherein the movement of the flap fairing 24 between the first position 51 and the second position 52 is defined by a translational movement 53 of the flap fairing 24 relative to the skin section 14 between the first position 51 and the second position 52.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flap system for an aircraft comprising:
a wing structure having a skin section with an aerodynamic outer surface;
a trailing-edge unit comprising at least one trailing-edge movable configured to move between a retracted position and an extended position; and
an attachment unit for movably coupling the at least one trailing-edge movable to the wing structure;
wherein the attachment unit comprises an attachment mechanism and a cover element which at least partly encloses the attachment mechanism;
wherein the attachment unit further comprises a drive element configured to move the cover element along the aerodynamic outer surface of the skin section between a first position and a second position;
wherein a movement of the cover element along the aerodynamic outer surface of the skin section between the first position and the second position is defined by a translational movement of the cover element relative to the skin section between the first position and the second position.

2. The flap system according to claim 1, wherein a rotational movement of at least a part of the cover element relative to the skin section is at least partially prevented when the cover element is moved along the aerodynamic outer surface of the skin section between the first position and the second position.

3. The flap system according to claim 1, wherein the translational movement of the cover element relative to the skin section between the first position and the second position is defined by a movement of the cover element parallel to the skin section.

4. The flap system according to claim 1, wherein the cover element covers the attachment mechanism from an air flow on the aerodynamic outer surface of the skin section when being moved along the aerodynamic outer surface of the skin section between the first position and the second position.

5. The flap system according to claim 1, wherein the cover element comprises a first cover portion and a second cover portion, and
wherein the attachment unit is configured to couple the first cover portion to the wing structure and to couple the second cover portion to the wing structure, such that the second cover portion is movable relative to the first cover portion.

6. The flap system according to claim 1, wherein the attachment mechanism of the attachment unit is configured to movably couple the at least one trailing-edge movable to the wing structure in order to enable a movement of the at least one trailing-edge movable between the retracted position and the extended position.

7. The flap system according to claim 1, wherein the drive element is configured to move the at least one trailing-edge movable via the attachment mechanism, and
wherein the cover element is coupled to the attachment mechanism via a coupling element, such that the drive element is configured to move the cover element via the attachment mechanism.

8. The flap system according to claim 1, wherein the drive element is configured to move the cover element along the aerodynamic outer surface of the skin section between the first position and the second position while the at least one trailing-edge movable is moved from the retracted position to the extended position.

9. The flap system according to claim 1, further comprising:
a sealing element configured to seal a gap between the cover element and the aerodynamic outer surface of the skin section.

10. The flap system according to claim 9, wherein the sealing element is configured to seal the gap between the cover element and the aerodynamic outer surface of the skin section during the movement of the cover element along the aerodynamic outer surface of the skin section between the first position and the second position.

11. The flap system according to claim 9, wherein the attachment unit comprises an engagement mechanism for movably coupling the cover element to the wing structure, and wherein the engagement mechanism comprises a track element and a corresponding engagement element that is configured to engage with the track element in order to movably couple the cover element to the wing structure.

12. The flap system according to claim 11, wherein the track element is coupled to the cover element and the engagement element is coupled to the wing structure, or wherein the track element is coupled to the wing structure and the engagement element is coupled to the cover element.

13. The flap system according to claim 11, wherein the engagement element comprises a roller arrangement that is configured for rolling engagement with the track element.

14. A method of operating a flap fairing at an aircraft wing, the method comprising:

activating a drive element which is coupled to a wing structure of the aircraft wing, wherein the wing structure comprises a skin section with an aerodynamic outer surface;

moving, by the drive element, at least one trailing-edge movable coupled to the drive element via an attachment mechanism, such that the at least one trailing-edge movable is moved from a retracted position to an extended position; and, moving, by the drive element, the flap fairing which at least partly encloses the attachment mechanism, wherein moving the flap fairing comprises moving the flap fairing along the aerodynamic outer surface of the skin section between a first position and a second position, and wherein a movement of the flap fairing between the first position and the second position is defined by a translational movement of the flap fairing relative to the skin section between the first position and the second position.

* * * * *